A. HARPER.
Trap Attachment with Corn-Cribs.

No. 214,654. Patented April 22, 1879.

UNITED STATES PATENT OFFICE.

ADAM HARPER, OF BOSWELL, INDIANA.

IMPROVEMENT IN TRAP ATTACHMENTS WITH CORN-CRIBS.

Specification forming part of Letters Patent No. 214,654, dated April 22, 1879; application filed February 19, 1879.

*To all whom it may concern:*

Be it known that I, ADAM HARPER, of Boswell, in the county of Benton and State of Indiana, have invented a new and Improved Combined Corn-Crib and Rat-Trap, of which the following is a specification.

Figure 1:
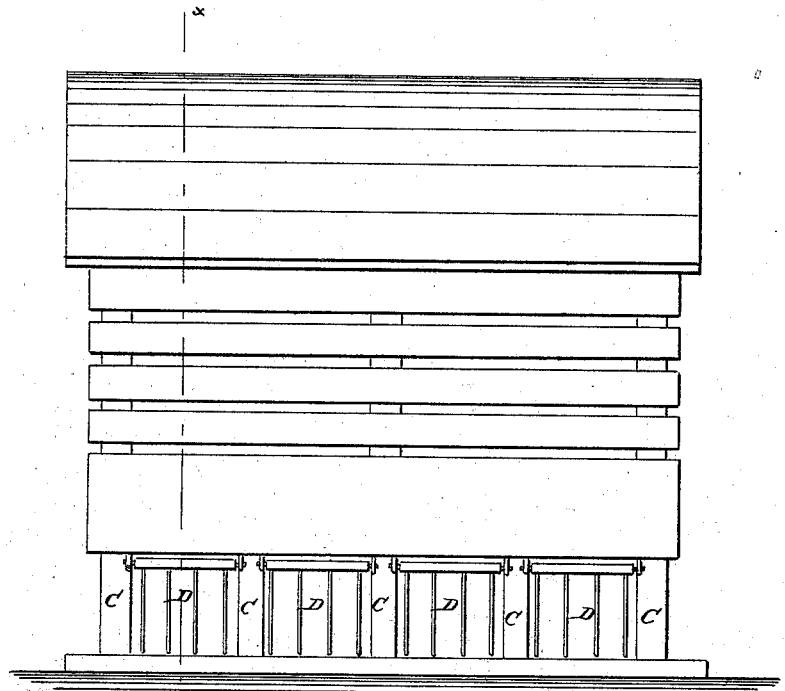
Figure 2:
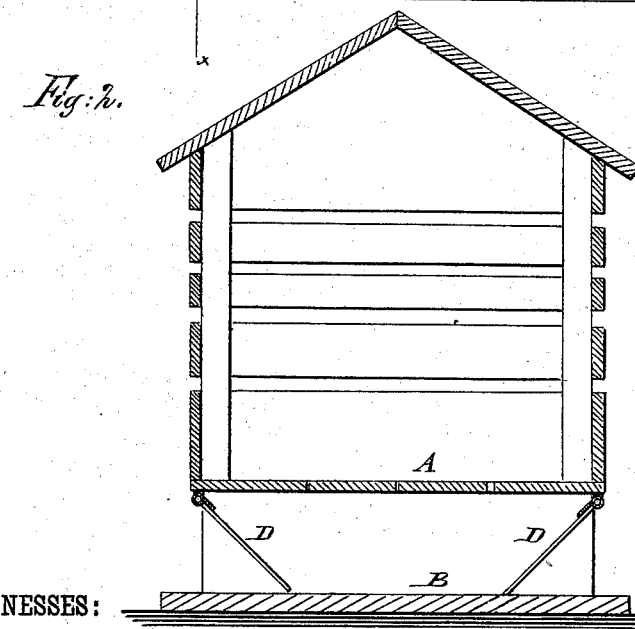

Figure 1 is an elevation of the crib and trap. Fig. 2 is a vertical section on line $x\ x$.

Similar letters of reference indicate corresponding parts.

The object of this invention is to provide a combined corn-crib and rat-trap—the one for the storage and shelter of corn, and the other to capture every rat that attempts to get at the corn.

The crib part of the combination is not unlike others designed for the same purpose, with spaces left between the boards on the sides and ends of the building, and also between the flooring-boards for the admission of air.

The invention consists in combining the raised and slatted bottom of a corn-house with swinging side racks, that rest inwardly on a subjacent floor, as hereinafter described.

In this design, however, below the usual floor A, there is another floor, B, the distance between the two being from eight to twelve inches, or thereabout; and the entire superstructure rests on sills C C, placed on the lower floor and extending from side to side, and thus forming several distinct passages through. The depth of the sills is so great that rats cannot reach from the lower floor to gnaw the upper one.

At the ends of each passage formed by the sills are suspended swinging racks D D, inclining inward and resting their lower ends on the lower floor. These racks are made of stout wire or metal rods, set so closely together that a rat cannot pass between them, and they fit at their sides so that no rat can pass between them and the sills. The rats attracted by the corn that falls through the crevises in the upper floor will raise these racks to get at it, and once within they will be unable to get out of the trap, and can be easily killed there by dogs or in some other way.

This arrangement makes a trap always set, and almost always baited with the corn falling through the upper floor, and the racks can be made and fitted in such a way that mice can be readily secured.

Should the vermin become shy of the trap, I prop the racks up for a few nights until they become used to going in and out, and then remove the props and let the racks return to their usual position.

Should the supply of corn fail, or should it cease to attract the vermin, other corn or bait may be thrown into the trap.

Having thus described my invention, I claim as new and desire to secure by Letters Patent—

The combination, with the slatted corn-house bottom A and subjacent floor B, of the swinging wire racks D, arranged as shown and described.

ADAM HARPER.

Witnesses:
WILLIAM R. HARDESTY, M. D.,
I. W. ROBERTSON.